United States Patent

[11] 3,530,843

[72] Inventor De Witt M. Fessenden
911 Summit Blvd., West Palm Beach, Florida 33405
[21] Appl. No. 769,508
[22] Filed Oct. 22, 1968
[45] Patented Sept. 29, 1970

[54] BLENDER AND CONVERTER
5 Claims, 6 Drawing Figs.
[52] U.S. Cl. ............................................. 123/119
[51] Int. Cl. .......................................... F02m 25/06
[50] Field of Search ............................... 123/119A; 60/29

[56] References Cited
UNITED STATES PATENTS

| | | | |
|---|---|---|---|
| 1,201,977 | 10/1916 | Lovejoy | 123/119 |
| 1,382,285 | 6/1921 | Harris | 123/119 |
| 1,440,956 | 1/1923 | Ballenger | 123/119 |
| 1,568,642 | 1/1926 | Thompson | 123/119 |
| 1,766,675 | 6/1930 | Moore | 123/119 |
| 2,300,774 | 11/1942 | Cartmell | 123/119 |
| 2,538,195 | 1/1951 | Henkel | 60/29 |
| 3,019,780 | 2/1962 | Nuding | 123/119 |
| 3,146,768 | 9/1964 | Osborne | 123/119 |
| 3,397,682 | 8/1968 | Riggan | 123/119 |
| 3,459,162 | 8/1969 | Burwinkle | 123/119 |

Primary Examiner—Wendell E. Burns
Attorney—John H. Oltman

ABSTRACT: A static blender and converter for an internal combustion engine having baffles for blending recycled exhaust gases with vaporized fuel and air and heat conductive structure for conducting heat from the engine to the baffles to convert any residual liquid in the fuel to gas. Hydrocarbon rich gases are separated in the exhaust conduit and fed back to the blender and converter.

Patented Sept. 29, 1970

3,530,843

INVENTOR.
DEWITT M. FESSENDEN.
BY John H. Oltman
ATT'Y.

BLENDER AND CONVERTER

BACKGROUND OF THE INVENTION

Proposals have been made to recycle exhaust gases from an internal combustion engine back to the cylinders of the engine to be re-burned in the hope of improving the efficiency of the engine. Some published studies have indicated that such recycling and re-burning of exhaust gases would not improve the performance of present day engines. However, these studies have been conducted with crude apparatus which has not been appropriately designed to extract the unused energy from exhaust gases.

SUMMARY OF THE INVENTION

The present invention provides a completely static blender and converter for efficiently blending recycled exhaust gases with vaporized fuel and air and at the same time converting any residual liquid in the fuel to the gaseous state. The blending is accomplished by baffles provided in a chamber, and in a preferred embodiment these baffles are a series of spaced and parallel plates having laterally staggered apertures which provide a tortuous flow path for gases to flow through the plates. Heat conductive structure is also provided for conducting heat from the engine to the plates where it can convert any liquid remaining in the gases to the gaseous state. The invention also includes a separator for extracting hydrocarbon rich gases from the exhaust conduit of the vehicle leaving hydrocarbon depleted gases to flow out of the exhaust conduit. The hydrocarbon rich gases are returned to the blender and converter where they are blended with incoming vaporized fuel and air as they flow through the baffle plates. In a preferred embodiment, the separator includes a partition across the inside of the exhaust conduit, an outlet from the exhaust conduit on the upstream side of the partition and a tube leading through the partition and projecting centrally of the exhaust conduit upstream beyond the outlet. As will be explained, hydrocarbons in the exhaust gases tend to flow around the outside of the tube and out the outlet back to the blender and converter, whereas hydrocarbon depleted exhaust gases flow through the tube and out through the remainder of the exhaust conduit.

Accordingly, it is an object of the present invention to provide a static device for blending recycled exhaust gases with vaporized fuel and air and for converting any residual liquid fuel to the gaseous state.

Another object of the invention is to provide a blender and converter including baffles for directing recycled exhaust gases, vaporized fuel and air through a tortuous path to blend them together.

Another object of the invention is to provide a blender and converter as just described with heat conductive structure for conducting heat from the engine to the baffles where it converts any liquid fuel in the gases to the gaseous state.

A further object of the invention is to provide a blender and converter with baffles in the form of spaced, parallel plates having or defining apertures which are staggered laterally of the plates to provide a tortuous flow path for the blending of gases by flow through the plates.

Another object of the invention is to provide a system for recycling exhaust gases from an internal combustion engine through a device which blends them with fuel and air and supplies the blended mixture to the engine, the system including a separator which extracts hydrocarbon rich gases from the exhaust conduit associated with the engine.

Still another object of the invention is to provide a separator for removing hydrocarbon rich gases from an exhaust conduit, the separator including a partition across the inside of the exhaust conduit, an outlet from the exhaust conduit on the upstream side of the partition, and a tube leading through the partition and projecting upstream in the conduit beyond the outlet.

Other objects of this invention will appear in the following description and appended claims, reference being had to the accompanying drawings forming a part of this specification wherein like reference characters designate corresponding parts in the several views.

ON THE DRAWINGS

Before explaining the present invention in detail, it is to be understood that the invention is not limited in its application to the details of construction and arrangements of parts illustrated in the accompanying drawings, since the invention is capable of other embodiments and of being practiced or carried out in various ways. Also, it is to be understood that the phraseology or terminology employed herein is for the purpose of description and not of limitation.

AS SHOWN ON THE DRAWINGS

Figure 1:
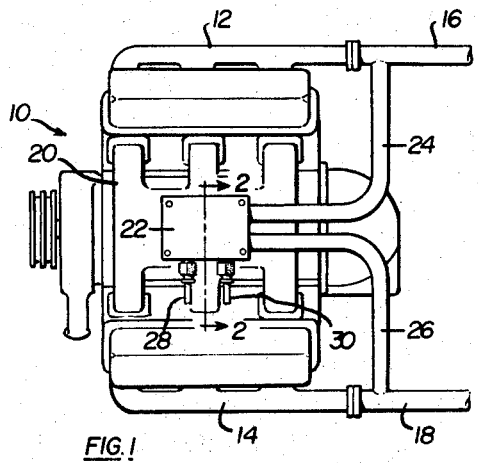
FIG. 1 is a plan view of an internal combustion engine provided with a blender and converter in accordance with one embodiment of the invention.

FIG. 1 shows an internal combustion engine 10 with some parts of the engine being omitted to show the blender and converter system more clearly. The engine has exhaust manifolds 12 and 14 which supply exhaust gases from the engine to exhaust pipes 16 and 18. The engine also has an intake manifold 20 for supplying the incoming explosive mixture to the cylinders of the engine. A V-type engine is shown, but it will be understood that the cylinders could be in line if desired.

The main housing of the blender and converter system is shown at 22 and it is mounted on the intake manifold 20. Two return conduits 24 and 26 lead respectively from the exhaust pipes 16 and 18 back to the housing 22 for recycling exhaust gases to be re-burned in the engine. The housing 22 is provided with an inlet 28 through which vaporized fuel is supplied into the housing 22 and another inlet 30 through which air is supplied into the housing 22. The vaporized fuel and air are blended with recycle exhaust gases in the housing 22 as will be explained. Although separate inlets 28 and 30 for supplying fuel and air to the housing 22 have been shown, it is to be understood that fuel and air could be premixed, for example in a carburetor, and the mixture supplied to the housing 22. In either case, the air should be filtered and the filtered air intake may be of the type which will accommodate crank case breathers. Fuel injection or any fuel metering system may be used to introduce fuel to the blender.

Figure 2:
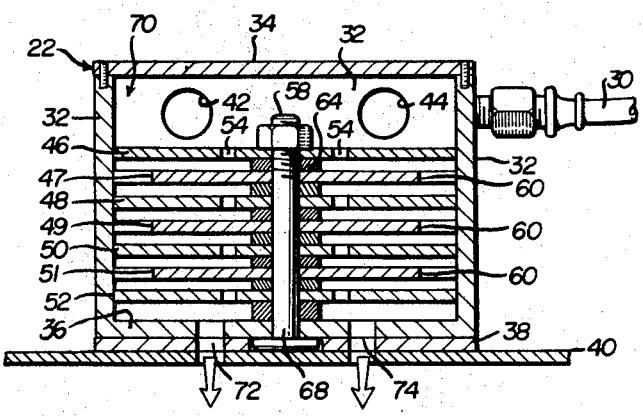
FIG. 2 is a sectional view through the main housing of the blender and converter taken along line 2–2 of FIG. 1.

FIG. 2 shows the interior of the housing 22. The housing 22 includes side walls 32, a removable top wall 34 and a bottom wall 36, these walls together with one other wall which is not visible forming an enclosure. All of these walls are preferably made of a heat conductive metal. A metal base plate 38 is mounted directly on the top wall 40 of the intake manifold, and the bottom wall 36 is mounted directly on base plate 38. The base plate may be considered as part of the housing. Bottom wall 36 and base plate 38 provide a heat conductive path for transferring heat to the interior of the housing as will be further explained.

The inlets 28 and 30 for vaporized fuel and air lead through one of the side walls 32 into the interior of the housing at the top of the housing. The two inlets 42 and 44 for the return conduits 24 and 26 lead through another one of the side walls 32 into the housing at the top of the housing.

Figure 3:
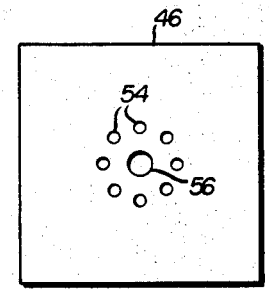
FIG. 3 is a plan view of one of two types of baffle plates provided in the blender and converter.
Figure 4:
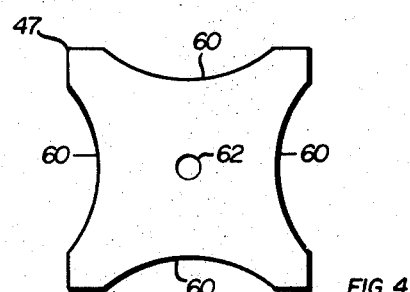
FIG. 4 is a plan view of one of the other type of plates provided in the blender and converter.

A plurality of baffle plates 46 through 52 inclusive are mounted inside the housing 22 in spaced parallel relation with each other and with the bottom wall 36. The baffle plates 46 through 52 preferably extend horizontally completely across the housing in all directions. Plates 46, 48, 50 and 52 are of the type shown in FIG. 3, only plate 46 being shown by way of example. This plate and the other like plates have a ring of apertures 54 located centrally of the plate and extending completely through the plate. There is also a central aperture 56 through which a bolt 58 extends. The other plates 47, 49 and 51 are of the type shown in FIG. 4, only 47 being shown by way of example. This plate and the other like plates have recessed peripheral edges 60 of a curved configuration so that the recessed edges 60 define apertures at the sidewalls 32 of the housing. The edges of all of the plates, except the recessed edges 60, should fit closely with the sidewalls 32 to prevent leakage of gases, and the non-recessed edges of the plates may be welded to the housing if desired. Plate 47 and the other like plates have a central aperture 62 through which the bolt 58 passes. The bolt 58 should fit snugly in the apertures 56 and 62.

The plates are spaced by washers 64 which contact the adjoining plate or plates and also the bolt 58. The bolt 58 passes through the bottom wall 36 of the housing, and the head 68 of the bolt fits in a recess in plate 38.

The baffle plates 46–52, the washers 64 and the bolt 58 are all made of heat conductive metal. The top wall 40 of the intake manifold gets hot when the engine is running, and heat from the intake manifold is conducted through plate 38, wall 36, washers 64 and bolt 58 to the plates 46–52.

The exhaust gases as recycled from the exhaust pipes 16 and 18 are under substantial pressure. Thus, the exhaust gases flow into the housing 22 through ports 42 and 44 and are received in a chamber 70 above the plates 46–52. Vaporized fuel, which is ordinarily gasoline, and air from inlets 28 and 30 are introduced into the exhaust gases in chamber 70. The exhaust gases, vaporized fuel and air flow through the apertures 54 and 60 in the plates 46–52 to the bottom of the housing, and from there flow through passages 72 and 74 into the intake manifold. The apertures 54 and 60 are staggered laterally and the plates 46–52 are spaced so as to provide a tortuous flow path between and through the plates which blends the exhaust gases, vaporized fuel and air. As previously mentioned, heat is conducted to the plates 46–52 from the intake manifold. This heat converts any residual liquid fuel in the gases to the gaseous state. This improves the efficiency of combustion.

It will be understood that an adapter can be provided to accommodate any number of intakes in the intake manifold.

Figure 5:
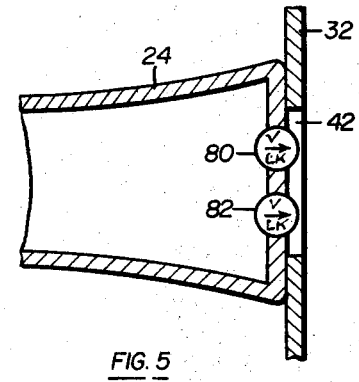
FIG. 5 is a schematic sectional view of the junction between a return conduit and the main housing of the blender and converter, the return conduit leading from an exhaust pipe for the engine to the housing.

FIG. 5 is a fragmentary sectional view showing the junction between one of the return conduits 24 and a side wall 32 of the housing. It may be seen that two check valves 80 and 82 are provided in the end of conduit 24 at the opening or port 42. One of these check valves is set to admit exhaust gases into the chamber 70 even at very low exhaust gas pressures, such as those which exist when the engine is idling. The other check valve does not open to admit exhaust gases until higher exhaust pressures are reached such as those which exist at high engine speeds. The other conduit 26 has a like arrangement of valves. These valves can be provided anywhere between the baffle plates and the exhaust pipe or pipes.

Figure 6:
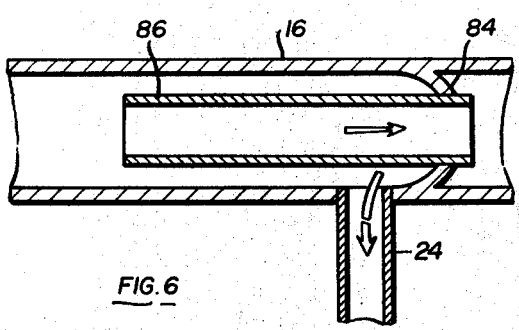
FIG. 6 is a fragmentary sectional view of a separator provided for an exhaust pipe associated with the engine.

FIG. 6 is a sectional view showing the junction between exhaust pipe 16 and the return conduit 24. At this junction, a separator is provided for extracting hydrocarbon rich exhaust gases from the exhaust pipe 16. After exhaust gases have traveled a substantial distance from the exhaust manifold 12, they tend to spiral through the exhaust pipe 16. As a result of this spiraling, hydrocarbons in the exhaust gases tend to concentrate near the wall of the exhaust pipe 16. At the center of the exhaust pipe 16, there are relatively few hydrocarbons. The separator takes advantage of this condition. The separator includes a partition 84 across the interior of exhaust pipe 16, and a tube 86 leading through the partition and projecting centrally of the exhaust pipe 16 upstream well beyond the return conduit 24. The tube 86 is spaced radially from the wall of exhaust conduit 16. Consequently, hydrocarbon rich exhaust gases flow along the space between tube 86 and pipe 16 and flow out through return conduit 24 back to the housing 22. Hydrocarbon depleted exhaust gases flow through tube 86 to the portion of exhaust pipe 16 on the downstream side of partition 84 and flow from there out of the exhaust pipe. Thus, the separator assures that the recycled exhaust gases have a relatively high content of hydrocarbons which are re-burned to improve the efficiency of the engine. The separator can be applied to any exhaust conduit.

Thus, the invention provides a system for recycling exhaust gases from an internal combustion engine and blending them with incoming fuel and air by flow along a tortuous path provided by baffles. The resulting explosive mixture is supplied from the baffles to the cylinders of the engine. The baffles are heated by heat from the engine to convert any liquid remaining in the vaporized fuel to the gaseous state. The system includes a separator for extracting hydrocarbon rich gases from the exhaust conduit for the engine. The system includes no moving parts, and thus is not susceptible to wear.

I claim:

1. In an automotive vehicle having an internal combustion engine with an exhaust conduit and an intake manifold which receive heat from the engine, a blender and converter in which exhaust gases, fuel and air are blended and liquid fuel is converted to gas by heat from the engine, said blender and converter comprising a housing having a heat conducting bottom closure wall mounted on and in heat transfer relation to a heated surface of said intake manifold with side and top closure walls projecting from said bottom closure wall, a central heat conducting post carrying a plurality of heat conducting baffle plates in spaced paralled relation above and parallel to said bottom wall, with said bottom wall, said post and said baffle plates forming a continuous heat transfer path supplying heat from the intake manifold to the spaces between said plates, first ones of said plates having generally central apertures therein and second ones of said plates having apertures spaced laterally outward from said central apertures with said second plates alternating with said first plates and said plates being substantially impervious except at said apertures, whereby said plates provide a tortuous flow path passing laterally inwardly and outwardly on opposite sides of plates for heat exchange purposes, said housing having a chamber therein above said plates, means for returning exhaust gases from said exhaust conduit to said chamber, and means for supplying vaporized or partially vaporized fuel and air to said chamber, whereby in the operation of the blender and converter the exhaust gases, fuel and air are blended in flowing through and laterally between said plates while receiving heat from said plates by heat exchange to promote vaporization of any liquid fuel enroute to said intake manifold.

2. The blender and converter as claimed in claim 1 in which said means for supplying exhaust gas from said exhaust conduit to said housing includes a separator for said exhaust conduit, said separator comprising a partition across said exhaust conduit, a tube leading through said partition and projecting upstream from said partition substantially centrally of said exhaust conduit, and a return conduit leading off from said exhaust conduit at a portion thereof opposite said tube, said tube projecting upstream in said exhaust conduit substantially beyond the junction thereof with said return conduit.

3. The blender and converter as claimed in claim 2 in which return conduit has a first check valve therein set to pass gases at low pressures and a second check valve parallel with said first valve and set to pass gases at substantially higher pressures.

4. A blender and converter in which exhaust gases, fuel and air are blended and liquid fuel is converted to gas by heat from an engine, said blender and converter comprising a housing having a heat conducting bottom closure wall to be mounted on and in heat transfer relation with a heated surface of an intake manifold with side and top closure walls projecting from said bottom closure wall, a central heat conducting post carrying a plurality of heat conducting baffle plates in spaced parallel relation above and parallel to said bottom wall with said bottom wall, said post and said baffle plates forming a continuous heat transfer path supplying heat from the intake manifold to the spaces between said plates, first ones of said plates having generally central apertures therein and second ones of said plates having apertures spaced laterally outward from said central apertures with said second plates alternating with said first plates and said plates being substantially impervious except at said apertures, whereby said plates provide a tortuous flow path passing laterally inwardly and outwardly on opposite sides of plates for heat exchange purposes, said housing having a chamber therein above said plates, means for returning exhaust gases from an exhaust conduit to said chamber, and means for supplying vaporized or partially vaporized fuel and air to said chamber, whereby in the operation of the blender and converter the exhaust gases, fuel and air are blended in flowing through and laterally between said plates while receiving heat from said plates by heat exchange to promote vaporization of any liquid fuel enroute to said intake manifold.

5. The blender and converter as claimed in claim 4 in which said heat conductive path further includes annular heat conductive spacers encircling said post and lying respectively between and in contact with said plates centrally of the apertures therein.